United States Patent
Shimizu

(10) Patent No.: US 10,203,979 B2
(45) Date of Patent: Feb. 12, 2019

(54) VIRTUAL MACHINE CONTROL DEVICE, METHOD FOR CONTROLLING VIRTUAL MACHINE CONTROL DEVICE, MANAGEMENT DEVICE, AND METHOD FOR CONTROLLING MANAGEMENT DEVICE

(71) Applicant: NEC Corporation, Tokyo (JP)

(72) Inventor: Atsushi Shimizu, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 2 days.

(21) Appl. No.: 15/672,831

(22) Filed: Aug. 9, 2017

(65) Prior Publication Data

US 2018/0060105 A1    Mar. 1, 2018

(30) Foreign Application Priority Data

Aug. 23, 2016   (JP) .................................. 2016-162851

(51) Int. Cl.
| | |
|---|---|
| *H04W 4/00* | (2018.01) |
| *G06F 9/455* | (2018.01) |
| *H04W 88/08* | (2009.01) |
| *H04W 72/04* | (2009.01) |

(52) U.S. Cl.
CPC .... *G06F 9/45558* (2013.01); *H04W 72/0406* (2013.01); *H04W 88/085* (2013.01); *G06F 2009/45562* (2013.01); *G06F 2009/45595* (2013.01); *H04W 88/08* (2013.01)

(58) Field of Classification Search
CPC . G06F 2009/45562; G06F 2009/45595; G06F 9/45558; H04W 72/0406; H04W 88/08; H04W 88/085
USPC ......................................................... 370/329
See application file for complete search history.

(56) References Cited

U.S. PATENT DOCUMENTS

| | | | | |
|---|---|---|---|---|
| 2012/0282900 | A1* | 11/2012 | Zhang | H04L 41/0856 455/411 |
| 2017/0026296 | A1* | 1/2017 | Kozat | H04L 47/2425 |
| 2017/0041291 | A1* | 2/2017 | Zibziner | H04L 63/0209 |
| 2017/0071008 | A1* | 3/2017 | Sunay | H04W 72/121 |
| 2017/0353903 | A1* | 12/2017 | Rost | H04W 36/10 |
| 2018/0217827 | A1* | 8/2018 | Arcese | G06F 8/65 |
| 2018/0227815 | A1* | 8/2018 | Sharma | H04W 36/08 |

FOREIGN PATENT DOCUMENTS

| | | |
|---|---|---|
| JP | 2015-191246 A | 11/2015 |
| WO | 2015/159527 A1 | 10/2015 |

* cited by examiner

*Primary Examiner* — Charles T Shedrick
(74) *Attorney, Agent, or Firm* — Sughrue Mion, PLLC

(57) ABSTRACT

A virtual machine control device that controls a C-Plane base station virtual machine for providing a base station function of a virtual base station. The virtual machine control device includes: a virtual machine controller configured to activate a clone of the C-Plane base station virtual machine that is a target of software update; and a virtual base station switching controller configured to assign a network assigned to the C-Plane base station virtual machine to the clone after performing the software update to the clone.

7 Claims, 13 Drawing Sheets

VIRTUAL MACHINE CONTROL DEVICE, METHOD FOR CONTROLLING VIRTUAL MACHINE CONTROL DEVICE, MANAGEMENT DEVICE, AND METHOD FOR CONTROLLING MANAGEMENT DEVICE

This application is based upon and claims the benefit of priority from Japanese Patent Application No. 2016-162851, filed on Aug. 23, 2016, the disclosure of which is incorporated herein in its entirety by reference.

TECHNICAL FIELD

The disclosed subject matter relates to a virtual machine control device and the like and in particular, relates to software update of a virtualized base station.

BACKGROUND ART

With the popularization of the LTE (Long Term Evolution) service, the number of base stations increases. There is an EMS (Element Management System) which operates and manages the base station. Operating a large number of base stations, especially, updating their software is causing an increase in burden on an operator or an equipment vendor.

For example, when the software update is performed to a certain base station, a software update process needs to be performed at a time period when this base station is least frequently used in view of effects on services.

A study is underway to develop a communication node with a virtual machine in a mobile communication network by using server virtualization technology.

In patent literature 1, there is disclosed a management system in which three virtual machines: a virtual machine for an active system, a virtual machine for a standby system, and a virtual machine for a secondary system are prepared and when a failure occurs, the virtual machine is switched to the virtual machine for a standby system having an application associated with that of the virtual machine for an active system so that the user has little influence when the failure occurs and a trouble can be smoothly handle.

Further, in patent literature 2, there is disclosed a communication device in which a plurality of virtual base stations and a virtual management server unit which manages the virtual base station are produced on common hardware in order to reduce the time required to newly install a base station or update software.

CITATION LIST

Patent Literature

[Patent Literature 1] Japanese Patent Application Laid-Open No. 2015-191246
[Patent Literature 2] International Publication No. 2015/159527

SUMMARY

Even when the software update is performed in the period in which the base station is least frequently used, it would be difficult to avoid an adverse effect such as disruption of service (call connection) because the base station is temporarily shut down when performing an update process.

Further, in the management system disclosed in patent literature 1, the virtual machine is switched when the failure occurs. This leads to a disconnection of the service (the outage of the service), but such disconnection of the service is not taken into consideration. The technology disclosed in patent literature 2 relates to software update to the virtual base station and in particular, relates to reduction of a software download time. Accordingly, the service outage time cannot be reduced by using this technology.

An object of the disclosed subject matter is to provide a virtual machine control device or the like that enables reduction of the service outage time of a virtualized base station when software of a base station virtual machine is updated.

A virtual machine control device controls a C-Plane base station virtual machine for providing a base station function of a virtual base station.

The virtual machine control device includes: a virtual machine controller configured to activate a clone of the C-Plane base station virtual machine that is a target of software update; and a virtual base station switching controller configured to assign a network assigned to the C-Plane base station virtual machine to the clone after performing the software update to the clone.

A management device is coupled to a virtual machine control device that controls a C-Plane base station virtual machine for providing a base station function in a virtual base station.

The management device includes: an update controller configured to instruct the virtual machine control device to activate a clone of the C-Plane base station virtual machine that is a target of software update and instruct an activated clone to perform software update; and a base station controller configured to instruct the virtual machine control device to assign a network assigned to the C-Plane base station virtual machine that is the target of software update to the clone to which the software update is performed.

A method for controlling a virtual machine control device is provided. The virtual machine control device controls a C-Plane base station virtual machine for providing a base station function of a virtual base station.

The method includes: activating a clone of the C-Plane base station virtual machine that is a target of software update; and assigning a network assigned to the C-Plane base station virtual machine to the clone after performing the software update to the clone.

A method for controlling a management device coupled to a virtual machine control device is provided. The virtual machine control device controls a U-Plane base station virtual machine for providing a base station function as a virtual base station.

The method includes: issuing an instruction to switch a connection destination of a C-Plane base station virtual machine operating in conjunction with the U-Plane base station virtual machine that is a target of software update and base station hardware from the U-Plane base station virtual machine to the U-Plane base station virtual machine that becomes a switching destination; instructing the U-Plane base station virtual machine to perform the software update; and issuing an instruction to switch the connection destination of the C-Plane base station virtual machine and the base station hardware from the U-Plane base station virtual machine that becomes the switching destination to the U-Plane base station virtual machine after performing the software update.

Advantageous Effects of Invention

The disclosed subject matter enables reduction of the service outage time of a virtualized base station when software of a base station virtual machine is updated.

EXAMPLE EMBODIMENT

Figure 1:
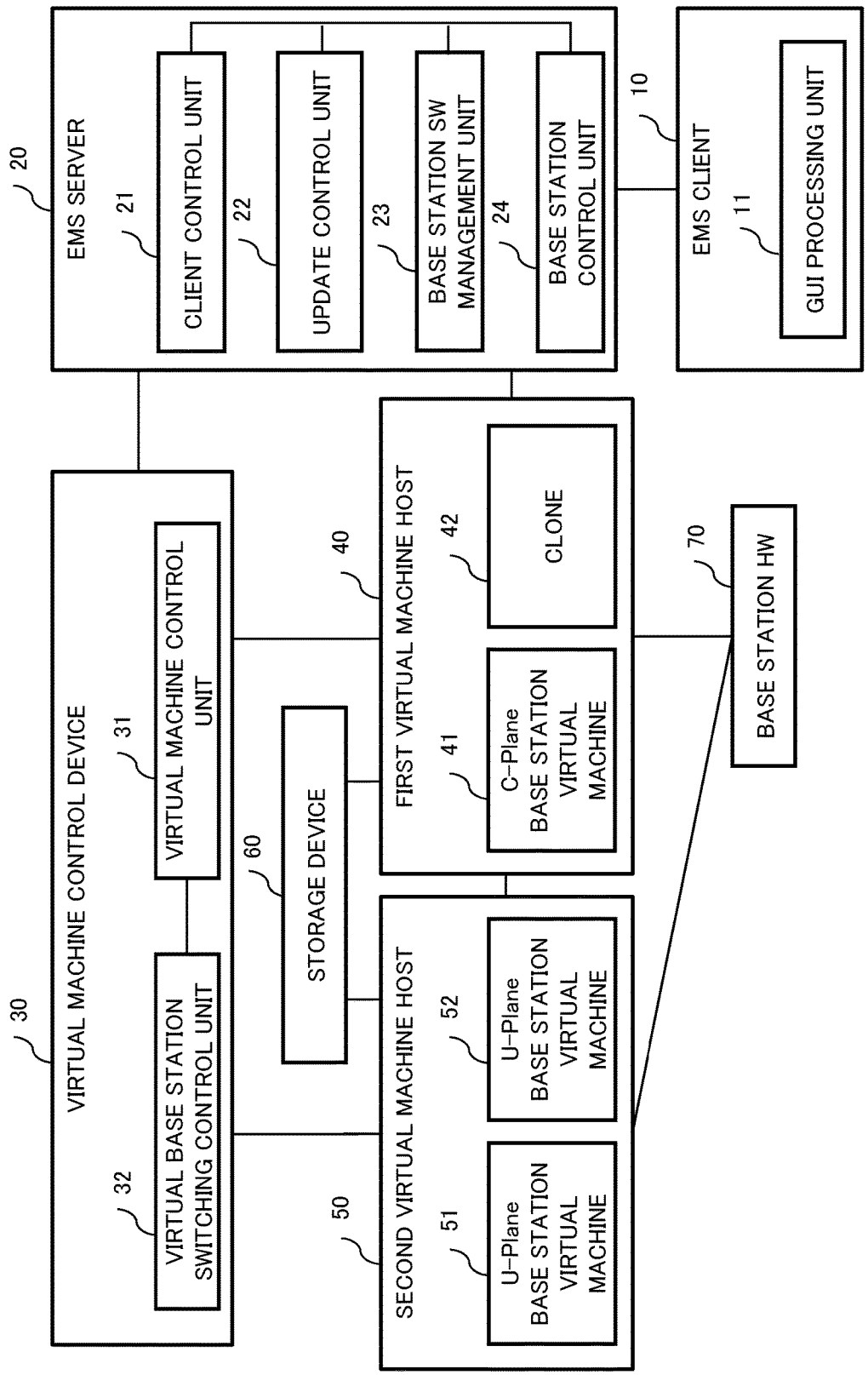
FIG. 1 is a block diagram illustrating a configuration of a management system according to a first example embodiment.

A management system according to a first example embodiment will be described by using FIG. 1. FIG. 1 is a block diagram illustrating a configuration of the management system according to the first example embodiment. As illustrated in FIG. 1, the management system includes an EMS client 10, an EMS server 20, a virtual machine control device 30, a first virtual machine host 40, a second virtual machine host 50, and base station hardware 70 (in FIG. 1, represented as base station HW 70).

The first virtual machine host 40 and the second virtual machine host 50 provide a platform for virtualizing the base station.

A C-Plane base station virtual machine 41 of the first virtual machine host 40 is a virtual machine on which a C-Plane portion is operated for realizing a base station function. Call processing connection information is held in a storage device 60 coupled to the first virtual machine host 40 in which the C-Plane base station virtual machine 41 is installed.

U-Plane base station virtual machines 51 and 52 are virtual machines on which a U-Plane portion is operated for realizing a base station function.

For example, functions of a virtual base station are realized by allowing the C-Plane base station virtual machine 41, the U-Plane base station virtual machine 51, and the base station hardware 70 to operate together.

The storage device 60 provides a storage space for sharing call processing information among the U-Plane base station virtual machines 51 and 52, the C-Plane base station virtual machine 41, and a clone 42. Further, the storage device 60 provides a storage space for holding the call processing connection information for taking over the call processing connection information between the C-Plane base station virtual machine 41 and the clone 42 thereof.

The base station hardware 70 is, for example, hardware such as an antenna of the base station, a GPS (Global Positioning System), or the like.

The EMS client 10, the EMS server 20, and the virtual machine control device 30 will be described below.

EMS Client

The EMS client 10 is a terminal that remotely operates the EMS server 20. By operating the EMS client 10, a network administrator or the like can transmit an instruction from the EMS server 20 to the virtual machine control device 30 and control the base station virtual machines that constitute the virtual base station. A GUI processing unit 11 of the EMS client 10 illustrated in FIG. 1 displays a screen for inputting update information relating to software update on a monitor (not illustrated).

EMS Server

As illustrated in FIG. 1, the EMS server 20 includes a client control unit 21, an update control unit 22, a base station SW management unit 23, and a base station control unit 24.

The client control unit 21 instructs the GUI processing unit 11 of the EMS client 10 to display an input screen for inputting the update information relating to software update of the base station virtual machine.

Further, the client control unit 21 acquires the update information from the EMS client 10 and sends the acquired update information to the update control unit 22. The update information includes, for example, update start date and time, information of the base station virtual machine that is a target of the update, and information of software to be used for the update.

At the update start date and time, the update control unit 22 instructs the virtual machine control device 30 to update the software included in the update information.

When the target of the software update is the C-Plane base station virtual machine 41, the update control unit 22 transmits an update program managed by the base station SW management unit 23 to the clone 42 of the C-Plane base station virtual machine 41 and instructs the clone 42 to perform the software update. The clone 42 performs the software update and transmits a completion report to the virtual machine control device 30.

The update control unit 22 may instruct the base station control unit 24 to pre-block a cell controlled by the C-Plane base station virtual machine 41 or stop pre-blocking the cell.

On the other hand, when the target of the software update is the U-Plane base station virtual machine 51, the update control unit 22 selects a U-Plane base station virtual machine that becomes a switching destination of the U-Plane base station virtual machine 51 in the second virtual machine host 50.

Specifically, the update control unit 22 acquires performance data of a plurality of the U-Plane base station virtual machines in the second virtual machine host 50 in which the U-Plane base station virtual machine 51 is installed. For example, the performance data of the U-Plane base station virtual machine includes a user data processing amount or the number of sessions. For example, the update control unit 22 selects the U-Plane base station virtual machine (for example, the U-Plane base station virtual machine 52) which is not the target of the software update and has the minimum load among a plurality of the U-Plane base station virtual machines as the switching destination on the basis of the performance data of the U-Plane base station virtual machine. The update control unit 22 informs the virtual machine control device 30 about the selection result indicating that the U-Plane base station virtual machine 52 is selected as the switching destination.

The update control unit 22 instructs the virtual machine control device 30 to switch a connection destination of the C-Plane base station virtual machine 41 operating in conjunction with the U-Plane base station virtual machine 51 and the base station hardware 70 to the U-Plane base station virtual machine 52 that becomes the switching destination or perform a reverse operation so that the C-Plane base station virtual machine 41 and the base station hardware 70 are coupled to the U-Plane base station virtual machine 51 again.

The update control unit 22 transmits the update program to the U-Plane base station virtual machine 51. After the connection destination of the C-Plane base station virtual machine 41 and the base station hardware 70 is switched to the U-Plane base station virtual machine 52 that becomes the switching destination, the update control unit 22 instructs the U-Plane base station virtual machine 51 to perform the software update.

Further, the update control unit 22 may instruct the base station control unit 24 to pre-block the cell controlled by the U-Plane base station virtual machine or stop pre-blocking the cell.

The base station SW management unit 23 manages the software used by the base station virtual machine installed in the virtual machine host. Further, the base station SW management unit 23 acquires the update program of the managed software from an external device.

The base station control unit 24 performs control relating to a C-Plane and a U-Plane of the C-Plane base station virtual machine and the U-Plane base station virtual machine. For example, the base station control unit 24 instructs the U-Plane base station virtual machine to pre-block the cell or stop pre-blocking the cell.

The base station control unit 24 instructs a virtual base station switching control unit 32 to perform the switching between the C-Plane base station virtual machine 41 and the clone 42 thereof.

The base station control unit 24 can acquire the performance data of the U-Plane base station virtual machines 51 and 52 in the second virtual machine host 50. The performance data includes the user data processing amount, the number of sessions, or the like.

Virtual Machine Control Device

The virtual machine control device 30 manages and controls the first virtual machine host 40 and the second virtual machine host 50, and provides an API (Application Programming Interface) which enables the first virtual machine host 40 and the second virtual machine host 50 to be controlled.

As illustrated in FIG. 1, the virtual machine control device 30 includes a virtual machine control unit 31 and the virtual base station switching control unit 32.

When the target of the software update is the C-Plane base station virtual machine 41, the virtual machine control unit 31 acquires, in response to an instruction from the EMS server 20, resource information of the first virtual machine host 40 in which the C-Plane base station virtual machine 41 is installed and reports the resource information to the update control unit 22 of the EMS server 20. For example, the resource information includes a usage rate of a CPU (Central Processing Unit) and a memory or a free space of the storage device 60.

When the first virtual machine host 40 has a resource, the virtual machine control unit 31 activates a virtual machine (hereinafter, referred to as a clone) equivalent to the C-Plane base station virtual machine 41 that is the target of the software update. The activated clone 42 is not coupled to a network for call processing and temporarily coupled to a network for management.

After the clone 42 performs the software update, the virtual base station switching control unit 32 of the virtual machine control device 30 assigns the network assigned to the operating C-Plane base station virtual machine 41 to the clone 42. Further, the virtual base station switching control unit 32 allows the clone 42 to access the storage device 60. For example, the clone 42 takes over the existing call in the C-Plane base station virtual machine 41 via the storage device 60 coupled to the first virtual machine host 40.

Next, when the target of the software update is the U-Plane base station virtual machine, the virtual base station switching control unit 32 switches the C-Plane base station virtual machine 41, which realizes the base station function in conjunction with the U-Plane base station virtual machines 51 and 52, and the base station hardware 70 to the U-Plane base station virtual machine 52 that becomes the switching destination indicated in the information received from the update control unit 22.

The virtual machine control unit 31 reduces (scales down) or increases (scales up) virtual hardware resources of the U-Plane base station virtual machine 51 and the U-Plane base station virtual machine 52 that becomes the switching destination.

Figure 2:
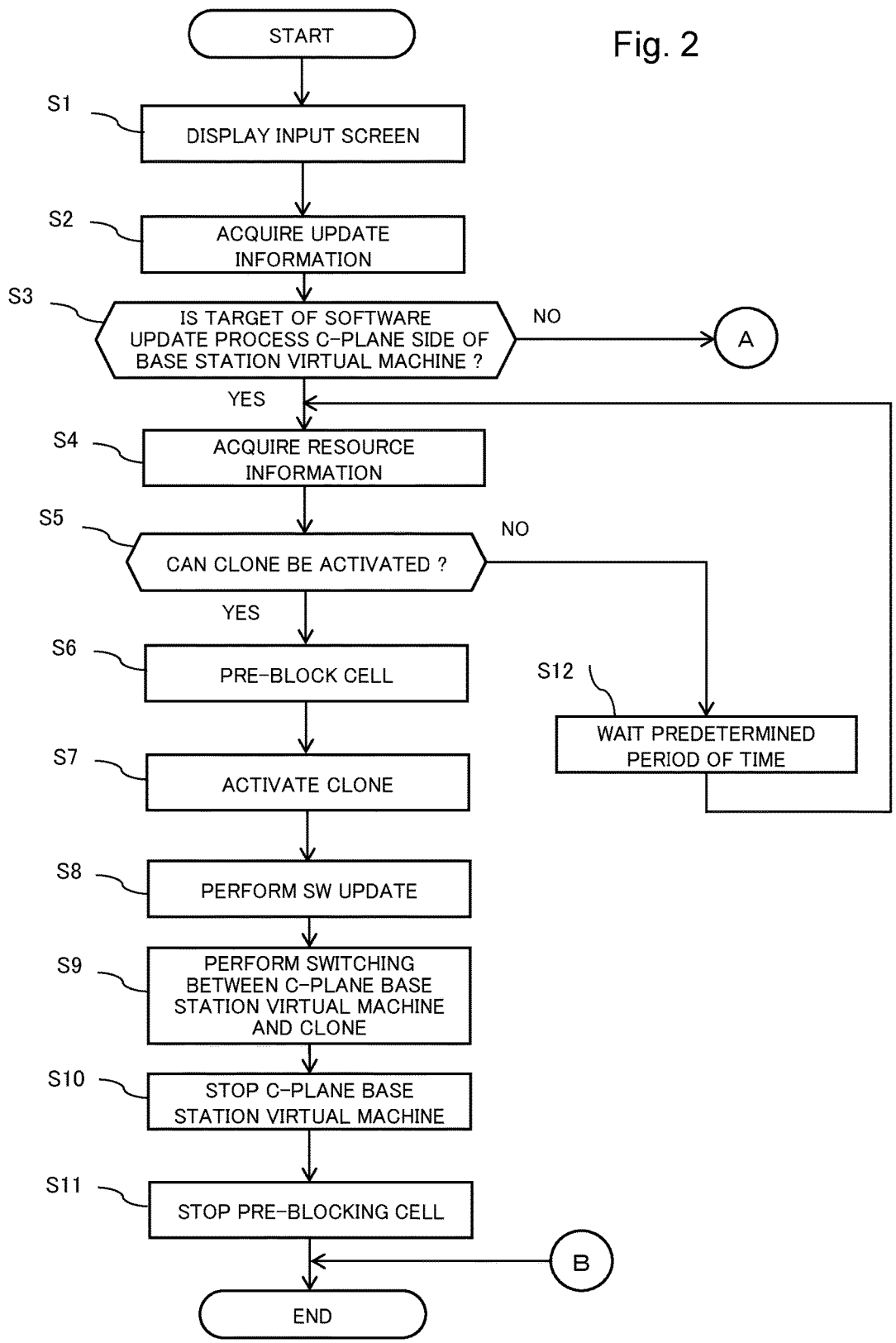
FIG. 2 is a flowchart illustrating a part of operation of a management system according to a first example embodiment.
Figure 3:
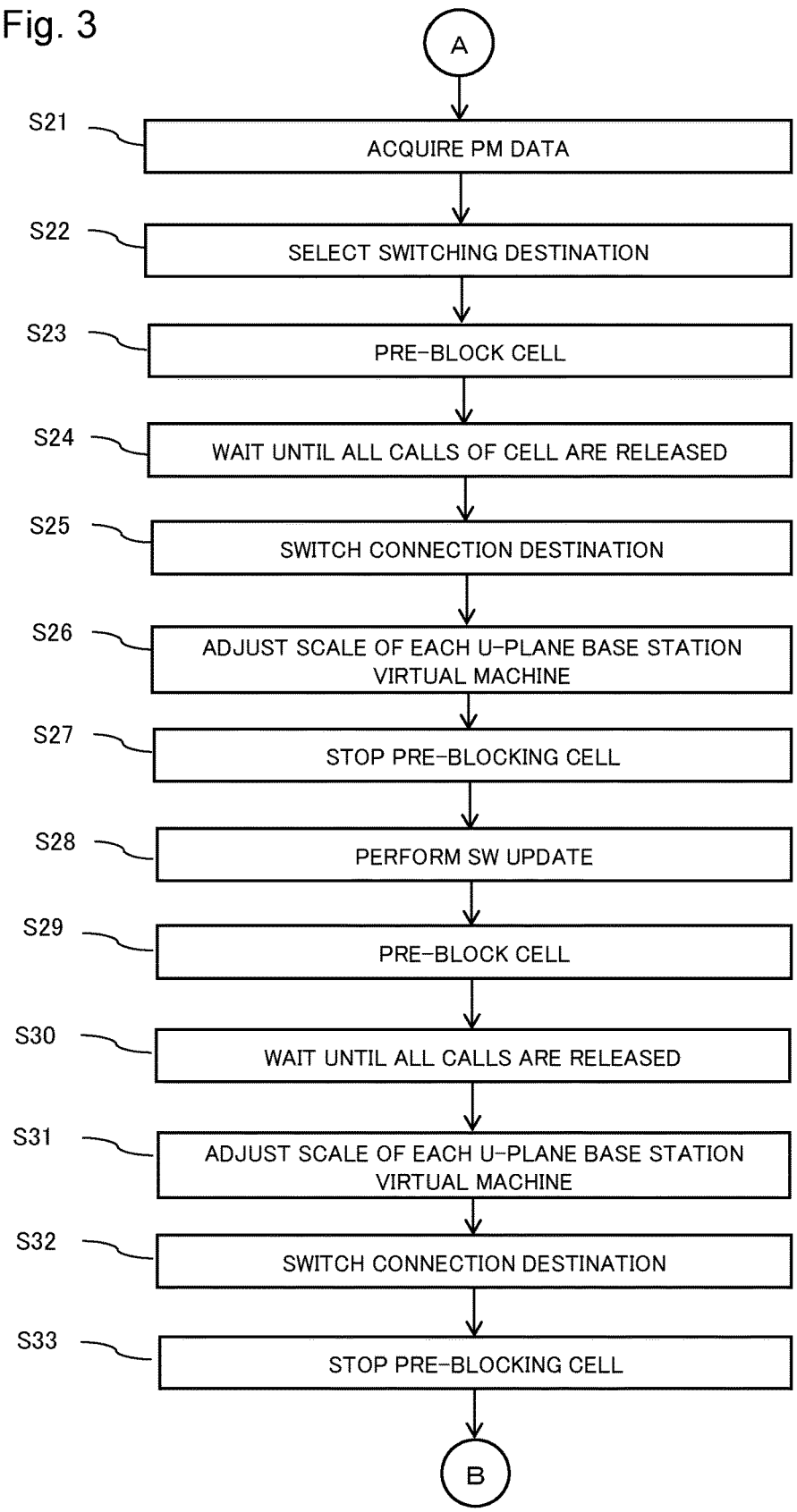
FIG. 3 is a flowchart illustrating a continued part of operation of a management system according to a first example embodiment.

Next, operation of the management system according to the first example embodiment will be described by using the drawing. FIG. 2 is a flowchart illustrating the operation of the management system.

The EMS server 20 obtains information indicating that software update is available to the base station virtual machine that constitutes the virtual base station from an equipment vendor or the like and notifies the EMS client 10 of the information indicating that software update is available to the base station virtual machine.

The client control unit 21 of the EMS server 20 instructs the GUI processing unit 11 of the EMS client 10 to display an input screen for inputting update information relating to software update performed to the base station virtual machine.

The GUI processing unit 11 of the EMS client 10 displays the input screen for inputting the update information (step S1). The update information includes, for example, update start date and time, information of the base station virtual machine that is a target of the update, or information of software to be used for the update. The information of the base station virtual machine is, for example, an identifier of the base station virtual machine. The software information is, for example, a software identifier.

For example, the update information is inputted by a network administrator or the like via the input screen. The inputted update information is sent from the EMS client 10 to the EMS server 20. The update control unit 22 acquires the update information (step S2).

The update control unit 22 determines whether or not the target of the software update is the C-Plane side of the base station virtual machine on the basis of the update information (step S3).

First, a case in which the target of the software update is the C-Plane base station virtual machine will be described.

When a determination result of step S3 indicates that the target of the software update is the C-Plane base station virtual machine (YES in step S3), the update control unit 22 of the EMS server 20 instructs the virtual machine control unit 31 of the virtual machine control device 30 to acquire the resource information of the first virtual machine host 40 in which the C-Plane base station virtual machine 41 is installed.

The virtual machine control unit 31 acquires the resource information of the first virtual machine host 40 in which the C-Plane base station virtual machine 41 is installed (step S4) and sends the acquired resource information to the update control unit 22 of the EMS server 20.

The update control unit 22 of the EMS server 20 determines whether or not the clone 42 of the C-Plane base station virtual machine 41 can be activated on the first virtual machine host 40 on the basis of the resource information (step S5). Information of the resource to be used to activate the clone 42 may be registered in the update control unit 22 in advance, or may be acquired from another device before making the determination.

The update control unit 22 instructs the base station control unit 24 of the EMS server 20 to stop receiving a new call transmitted from a UE (User Equipment) to the C-Plane base station virtual machine 41 as preliminary preparation for activating the clone 42. The base station control unit 24 instructs the C-Plane base station virtual machine 41 to pre-block the cell. The C-Plane base station virtual machine 41 pre-blocks the cell (step S6).

After completion of pre-blocking the cell by the C-Plane base station virtual machine 41, the virtual machine control unit 31 creates and activates the clone 42 of the C-Plane base station virtual machine 41 in the first virtual machine host 40 (step S7). At this time, the C-Plane base station virtual machine 41 is kept in operation.

After the clone 42 is activated, the update control unit 22 transmits the update program indicated in the update information to the clone 42 and instructs the clone 42 to perform software update. The clone 42 verifies and validates the upload program, and performs software update (step S8). The clone 42 informs the update control unit 22 of the completion of the software upload.

After completing the software update, the update control unit 22 informs the virtual machine control device 30 of the completion of the software update. The update control unit 22 instructs the base station control unit 24 to switch the virtual machines. The base station control unit 24 instructs the virtual base station switching control unit 32 to perform the switching between the C-Plane base station virtual machine 41 and the clone 42. The virtual base station switching control unit 32 of the virtual machine control device 30 performs the switching between the C-Plane base station virtual machine 41 and the clone 42 (step S9).

Specifically, the virtual base station switching control unit 32 assigns the network assigned to the operating C-Plane base station virtual machine 41 to the clone 42. Further, the virtual base station switching control unit 32 allows the clone 42 to access the storage device 60. The clone 42 takes over the existing call in the C-Plane base station virtual machine 41 via the storage device 60 coupled to the first virtual machine host 40.

The update control unit 22 instructs the virtual machine control unit 31 to stop or remove the originally operating C-Plane base station virtual machine 41. The virtual machine control unit 31 stops or removes the C-Plane base station virtual machine 41 with old software (step S10). Further, the instruction to remove or stop the C-Plane base station virtual machine 41 may be inputted in step S1 in which the update information is inputted. Alternatively, the instruction may be selected according to the resource status of the first virtual machine host 40 in which the clone 42 is installed.

The update control unit 22 instructs the base station control unit 24 to cancel the instruction to stop receiving the new call from the UE. The base station control unit 24 instructs the clone 42 to stop pre-blocking the cell, and the clone 42 stops pre-blocking the cell (step S11).

Further, when it is determined in step S5 whether or not the clone 42 can be activated, if the clone 42 cannot be activated because of a load status of the first virtual machine host 40 (NO in step S5), the update control unit 22 instructs the client control unit 21 of the EMS server 20 to output a warning message to the EMS client 10. The update control unit 22 is put on standby for a predetermined period of time (step S12) and the process goes back to the process of step S4.

Next, a case in which the target of the software update is the U-Plane base station virtual machine will describe.

When a determination result of step S3 indicates that the target of the software update is not the C-Plane base station virtual machine (NO in step S3), the update control unit 22 instructs the virtual machine control unit 31 to acquire and send PM (Performance Management) data of the U-Plane base station virtual machine installed in the second virtual machine host 50. The update control unit 22 acquires the PM data from the virtual machine control unit 31 (step S21).

The update control unit 22 selects the U-Plane base station virtual machine that becomes the switching destination of the function unit of the U-Plane base station virtual machine 51 in the second virtual machine hosts 50 on the basis of the acquired PM data (step S22). As the U-Plane base station virtual machine that becomes the switching destination, for example, the U-Plane base station virtual machine that has the minimum load in the second virtual machine host is selected, except for the U-Plane base station virtual machine 51, on the basis of the PM data.

Further, the function of the base station in the virtual base station is realized by a fixed combination of the U-Plane base station virtual machine, the C-Plane base station virtual machine, and the base station hardware. Accordingly, when the update control unit 22 simply stops the U-Plane base station virtual machine 51, the base station hardware 70 cannot emit a radio wave, and additionally, the resource of the C-Plane base station virtual machine that has been operating together may not be used anymore. A method for stopping the U-Plane base station virtual machine and like operations in view of the above will be described below.

First, the update control unit 22 instructs the base station control unit 24 to pre-block the cell controlled by the U-Plane base station virtual machine 51. The base station control unit 24 instructs the U-Plane base station virtual machine 51 to pre-block the cell and the U-Plane base station virtual machine 51 pre-blocks the cell (step S23).

The base station control unit 24 monitors the number of existing calls of the cell of the U-Plane base station virtual machine 51 and is put on standby until all the calls of the cell are released (step S24). When all the calls are released, the base station control unit 24 informs the update control unit 22 of the release completion. Alternatively, a timer may be used, and when a predetermined period of time elapses, the cell may be blocked without waiting for the release completion of all the calls.

The virtual base station switching control unit 32 of the virtual machine control device 30 instructs the first virtual machine host 40 and the second virtual machine host 50 to switch the connection destination so that the C-Plane base station virtual machine 41, which has been operating in conjunction with the U-Plane base station virtual machine 51 and the base station hardware 70, now operates in conjunction with the U-Plane base station virtual machine 52 that becomes the switching destination selected in step S22. The first virtual machine host 40 and the second virtual machine host 50 switch the connection destination of the C-Plane base station virtual machine 41 and the base station hardware 70 to the U-Plane base station virtual machine 52 (step S25).

Specifically, the virtual base station switching control unit 32 instructs a network switch (not illustrated) between a MFH (Mobile Front-Haul) and the first virtual machine host 40 and a network switch (not illustrated) between a MFH (Mobile Front-Haul) and the second virtual machine host 50 or a network switch (not illustrated) in the first virtual machine host 40 and a network switch (not illustrated) in the second virtual machine host 50 to perform the switching in order to switch the base station hardware 70.

Further, the virtual base station switching control unit 32 instructs the network switch (not illustrated) in the first virtual machine host 40 and the network switch (not illustrated) in the second virtual machine host 50 or the network switch (not illustrated) existing between the first virtual machine host 40 and the second virtual machine host 50 to perform the switching in order to switch the connection with the C-Plane base station virtual machine 41.

The virtual machine control unit 31 adjusts a scale of each U-Plane base station virtual machine in the second virtual machine host 50 (step S26). Specifically, the virtual machine control unit 31 scales down (reduces) the virtual hardware resource (a CPU, a memory, or the like) of the U-Plane base station virtual machine 51 to a value set in advance. Further, the virtual machine control unit 31 scales up (increases) the virtual hardware resource of the U-Plane base station virtual machine 52 that becomes the switching destination by an amount equal to a scaled-down amount. After the virtual machine control unit 31 scales up the virtual hardware resource, the virtual machine control unit 31 notifies the update control unit 22 of the completion of the scale up.

The update control unit 22 of the EMS server 20 instructs the base station control unit 24 to stop pre-blocking the cell. The base station control unit 24 which receives the instruction stops pre-blocking the cell controlled by the U-Plane base station virtual machine 52 that becomes the switching destination (Step S27).

The update control unit 22 acquires the upload program designated by the base station SW management unit 23 in step 51 and transmits the upload program to the U-Plane base station virtual machine 51. The update control unit 22 instructs the U-Plane base station virtual machine 51 to perform software update. The U-Plane base station virtual machine 51 performs the software update (in FIG. 2, described as "perform SW update", SW is software) (step S28).

The update control unit 22 instructs the base station control unit 24 to pre-block the cell controlled by the U-Plane base station virtual machine 52 that becomes the switching destination. The base station control unit 24 which receives the instruction pre-blocks the cell of the U-Plane base station virtual machine 52 that becomes the switching destination (step S29).

The base station control unit 24 monitors the number of existing calls of the cell and is put on standby until all the calls are released (step S30). When all the calls are released, the base station control unit 24 informs the update control unit 22 of the release completion. Alternatively, a timer may be used, and when a predetermined period of time elapses, the cell may be blocked without waiting for the release completion of all the calls. The update control unit 22 informs the virtual machine control device 30 of the completion of a software update process.

The virtual machine control unit 31 adjusts the scale of each U-Plane base station virtual machine in the second virtual machine host 50 (step S31). Specifically, the virtual machine control unit 31 scales down the virtual hardware resource of the U-Plane base station virtual machine 51 with old software to a value set in advance. Further, the virtual machine control unit 31 scales up the virtual hardware resource of the U-Plane base station virtual machine 52 that becomes the switching destination to bring the virtual hardware resource back to a value equal to that used in step S26 and the previous steps.

The virtual base station switching control unit 32 instructs the first virtual machine host 40 and the second virtual machine host 50 to switch the connection destination from the U-Plane base station virtual machine 52 that has been the switching destination to the U-Plane base station virtual machine 51 to which the software update is performed. Specifically, the virtual base station switching control units 32 instructs the network switch between the MFH (Mobile Front-Haul) and the first virtual machine host 40 and the network switch between the MFH and the second virtual machine host 50 or the network switch in the first virtual machine host 40 and the network switch in the second virtual machine host 50 to perform the switching.

The first virtual machine host 40 and the second virtual machine host 50 switch the connection destination of the C-Plane base station virtual machine 41 and the base station hardware 70 to the U-Plane base station virtual machine 51 (step S32). After the completion of the switching, the virtual base station switching control unit 32 notifies the update control unit 22 of the completion of the switching.

The update control unit 22 instructs the base station control unit 24 to stop pre-blocking the cell. The base station control unit 24 stops pre-blocking the cell controlled by the U-Plane base station virtual machine 51 to which the software update is performed (step S33).

Modification Example of First Example Embodiment

In the first example embodiment, a case in which the EMS server has a function to control the software update is illustrated as an example. However, the device which has the function to control the software update is not limited to the EMS server. For example, a base station construction server to be used when a virtual base station is installed or a tool may have this function. The EMS server 20 in the first example embodiment may be provided by the virtual machine. A plurality of the first virtual machine hosts 40 and a plurality of the second virtual machine hosts 50 may be installed. A plurality of the C-Plane base station virtual machines may be installed in the first virtual machine host 40 and a plurality of the U-Plane base station virtual machines may be installed in the second virtual machine host 50. The storage device 60 may be installed in both the first virtual machine host 40 and the second virtual machine host 50.

Further, the EMS server may be employed in not only the base station but also a plurality of the devices including the base station and a device equivalent to the EMS server for accommodating these devices, an orchestrator, a MANO (Management and Network Orchestration), or a VNFM (Virtual Network Functions Manager).

Effect of First Example Embodiment

According to the first example embodiment, when the software update is performed to the virtual machine which provides the function of a virtualized base station, the service outage time of the virtualized base station can be reduced.

A first reason is that after the clone of the C-Plane base station virtual machine that is the target of the software update is activated and the software update is performed to the clone, a network of the C-Plane base station virtual machine that is the target of the software update is switched to the clone to which the software update is performed. A second reason is that the connection destinations of the C-Plane base station virtual machine operating in conjunction with the U-Plane base station virtual machine that is the target of the software update and the base station hardware are switched to another U-Plane base station virtual machine, the software update is performed to the U-Plane base station virtual machine that is the target of the software update while being switched, and after the software update, the switching is performed so that the connection to the original U-Plane base station virtual machine is restored.

Further, since the service outage time which occurs when the software update is performed to the base station can be reduced according to the first example embodiment, it is expected that a base station's software update schedule in which the influence of the service outage is taken into consideration may be easily created.

Second Example Embodiment

Figure 4:
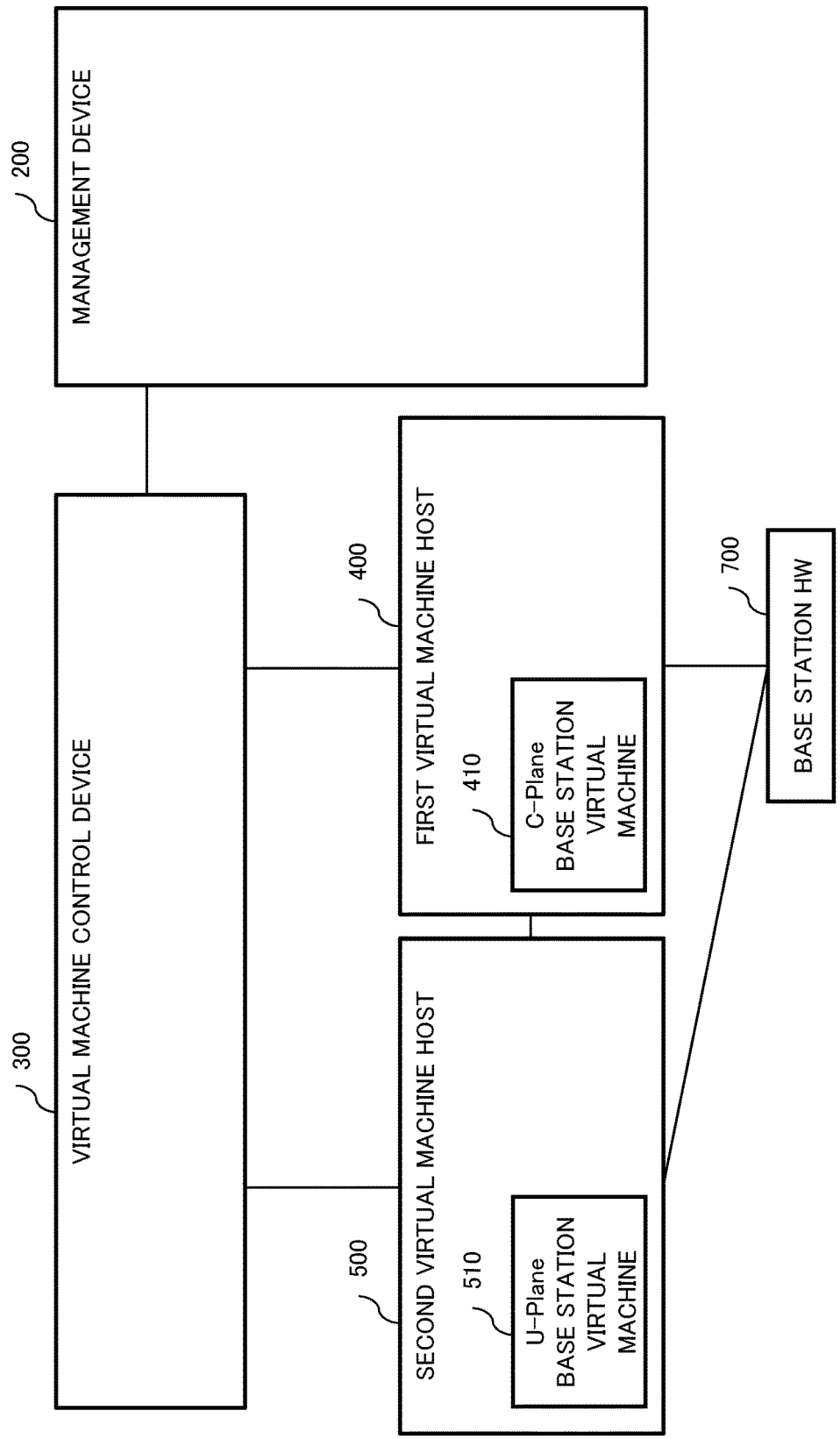
FIG. 4 is a block diagram illustrating a configuration of a management system according to a second example embodiment.

FIG. 4 is a block diagram illustrating a configuration of a management system according to a second example embodiment. The management system includes a management device 200, a virtual machine control device 300, a first virtual machine host 400, a second virtual machine host 500, and a base station hardware 700.

A virtual base station managed by the management device 200 functions as a base station by allowing a C-Plane base station virtual machine 410 of the first virtual machine host 400, a U-Plane base station virtual machine 510 of the second virtual machine host 500, and the base station hardware 700 to operate together. For example, the base station hardware 700 is hardware such as an antenna or a GPS (Global Positioning System) that constitutes a virtual base station.

Virtual Machine Control Device

Figure 5:
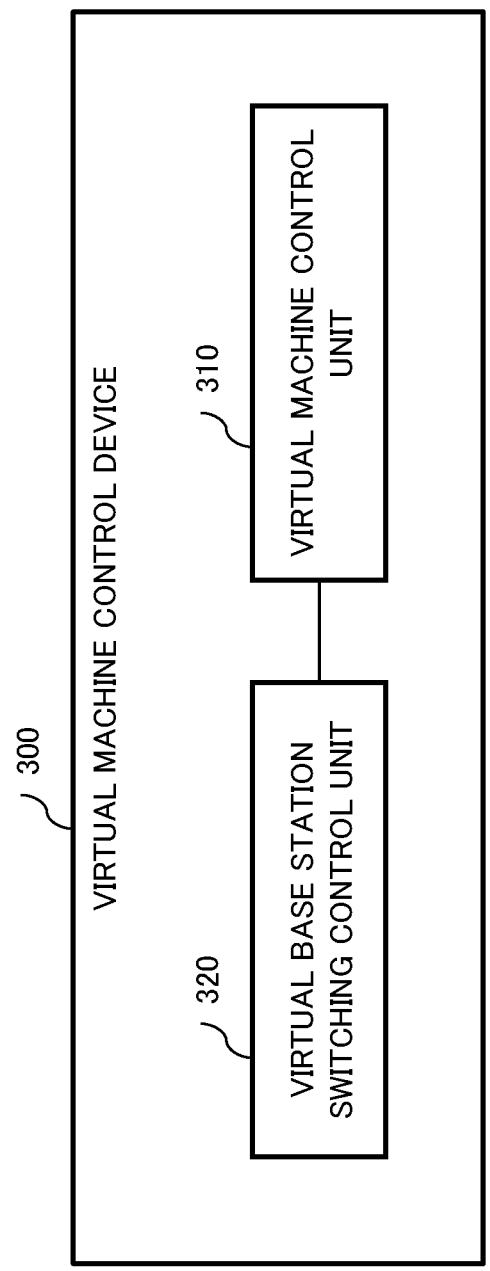
FIG. 5 is a block diagram illustrating a configuration of a virtual machine control device according to a second example embodiment.

FIG. 5 is a block diagram illustrating a configuration of the virtual machine control device according to the first example embodiment. As illustrated in FIG. 5, the virtual machine control device 300 includes a virtual machine control unit 310 and a virtual base station switching control unit 320.

The virtual machine control device 300 controls the base station virtual machine installed in both the first virtual machine host 400 and the second virtual machine host 500. The base station virtual machine is a virtual machine which provides the base station function of the virtual base station. The virtual machine control device 300 is coupled to the management device 200 and receives various instructions from the management device 200 to control the base station virtual machine that constitutes the virtual base station.

Figure 6:
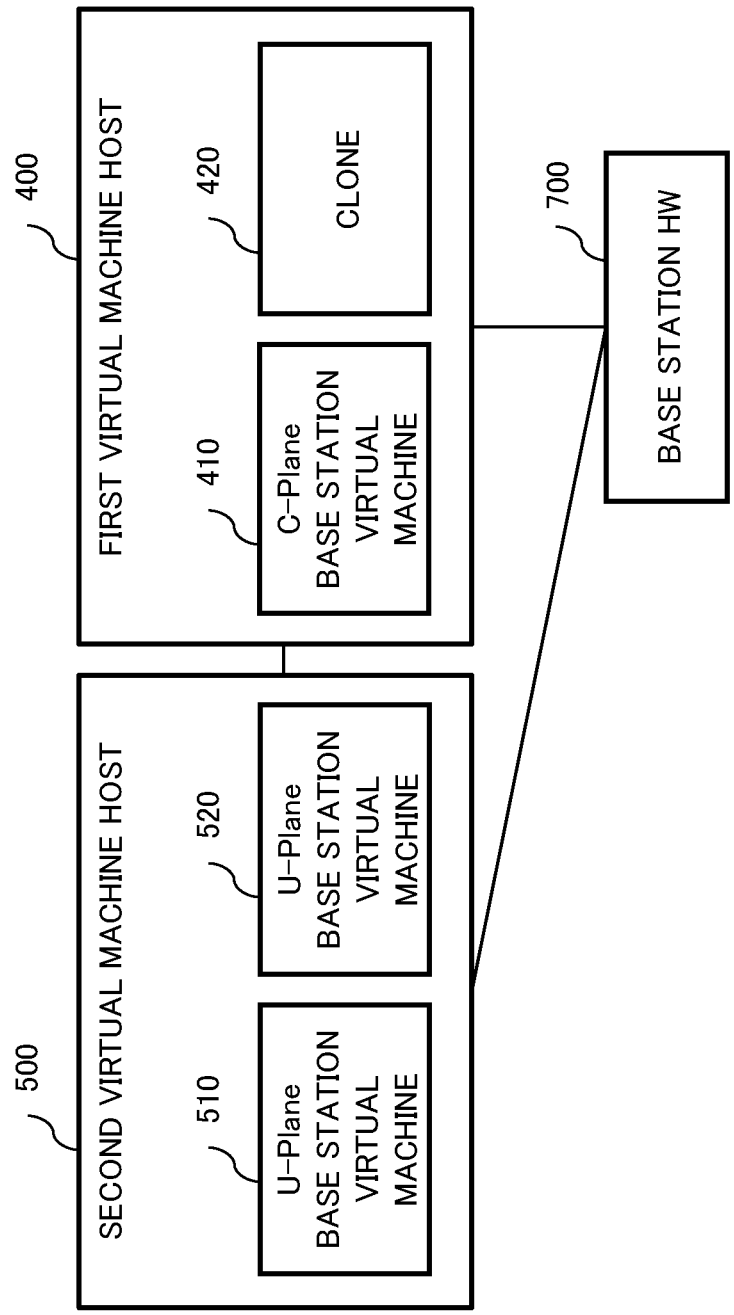
FIG. 6 is an explanatory drawing for explaining a base station virtual machine installed in a first virtual machine host and a second virtual machine host.

FIG. 6 is an explanatory drawing for explaining the base station virtual machine installed in the first virtual machine host 400 and the second virtual machine host 500. In FIG. 6, the C-Plane base station virtual machine 410 and a clone 420 are installed in the first virtual machine host 400 and the U-Plane base station virtual machines 510 and 520 are installed in the second virtual machine host 500.

When the software update is performed to the C-Plane base station virtual machine 410, the virtual machine control unit 310 activates the clone 420 of the base station virtual machine 410 that is the target of the software update and performs the software update to the activated clone 420. An example of the clone 420 is the virtual machine that is a replica of the base station virtual machine 410.

When the software update is performed to the U-Plane base station virtual machine 510, the virtual machine control unit 310 performs the software update to the U-Plane base station virtual machine 510 after the C-Plane base station virtual machine 410 operating in conjunction with the U-Plane base station virtual machine 510 and the base station hardware 700 are switched to the U-Plane base station virtual machine 520 that becomes the switching destination.

Further, the virtual machine control unit 310 acquires performance data of the base station virtual machine other than the U-Plane base station virtual machine 510 that is the target of the software update from the second virtual machine host 500 and transmits the performance data to the management device 200.

The virtual base station switching control unit 320 instructs the first virtual machine host 400 to assign the network assigned to the C-Plane base station virtual machine 410 that is the target of the software update to the clone 420 to which the software update is performed.

Further, the virtual base station switching control unit 320 instructs the first virtual machine host 400 and the second virtual machine host 500 to switch the connection destination of the C-Plane base station virtual machine 410 operating in conjunction with the U-Plane base station virtual machine 510 and the base station hardware 700 to the U-Plane base station virtual machine 520 before performing the software update. Further, the virtual base station switching control unit 320 instructs the first virtual machine host 400 and the second virtual machine host 500 to switch the connection destination of the C-Plane base station virtual machine 410 and the base station hardware 700 from the U-Plane base station virtual machine 520 to the U-Plane base station virtual machine 510 after performing the software update.

Management Device

The management device 200 is coupled to the virtual machine control device 300 which controls the base station virtual machine that constitutes the virtual base station and transmits various instructions to the virtual machine control device 300 to control the base station virtual machine.

Figure 7:
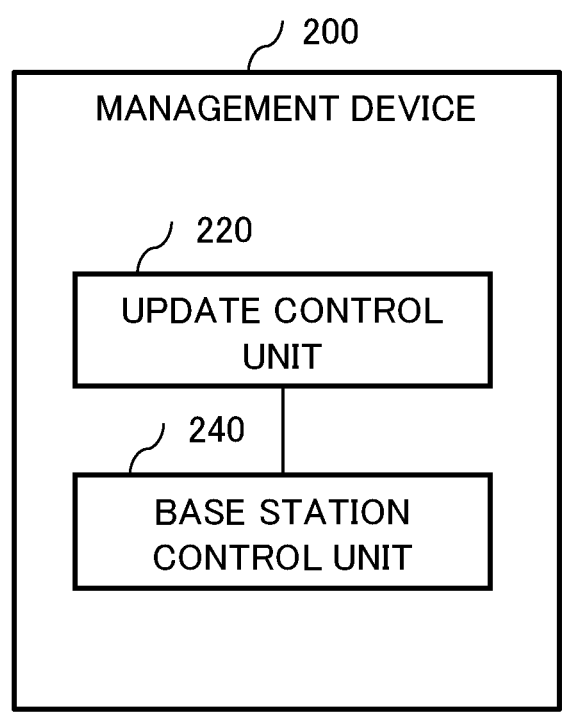
FIG. 7 is a block diagram illustrating a configuration of a management device according to a second example embodiment.

FIG. 7 is a block diagram illustrating a configuration of the management device according to the second example embodiment. As illustrated in FIG. 7, the management device 200 includes an update control unit 220 and a base station control unit 240.

When the software update is performed to the C-Plane base station virtual machine 410, the update control unit 220 instructs the virtual machine control device 300 to activate the clone 420 of the C-Plane base station virtual machine 410 that is the target of the software update and perform the software update to the activated clone 420.

Further, when performing the software update to the U-Plane base station virtual machine, the update control unit 220 instructs the virtual machine control device 300 to perform the software update to the U-Plane base station virtual machine 510 after the C-Plane base station virtual machine 410 operating in conjunction with the U-Plane base station virtual machine 510 that is the target of the software update and the base station hardware 700 are switched to the U-Plane base station virtual machine 520 that becomes the switching destination of the U-Plane base station virtual machine 510.

Further, the update control unit 220 acquires the performance data of the U-Plane base station virtual machine other than the U-Plane base station virtual machine 510 that is the target of the software update from the virtual machine control device 300 and selects the U-Plane base station virtual machine that becomes the switching destination on the basis of the performance data.

When the software update is performed to the C-Plane base station virtual machine, the base station control unit 240 instructs the virtual machine control device 300 to assign the network assigned to the C-Plane base station virtual machine 410 that is the target of the software update to the clone 420 to which the software update is performed.

Further, when the software update is performed to the U-Plane base station virtual machine, the base station control unit 240 instructs the virtual machine control device 300 to switch the connection destination of the C-Plane base station virtual machine 410 operating in conjunction with the U-Plane base station virtual machine 510 and the base station hardware 700 to the U-Plane base station virtual machine 520 before performing the software update. Further, after performing the software update, the base station control unit 240 instructs the virtual machine control device 300 to switch the connection destination of the C-Plane base station virtual machine 410 and the base station hardware 700 from the U-Plane base station virtual machine 520 to the U-Plane base station virtual machine 510.

Figure 8:
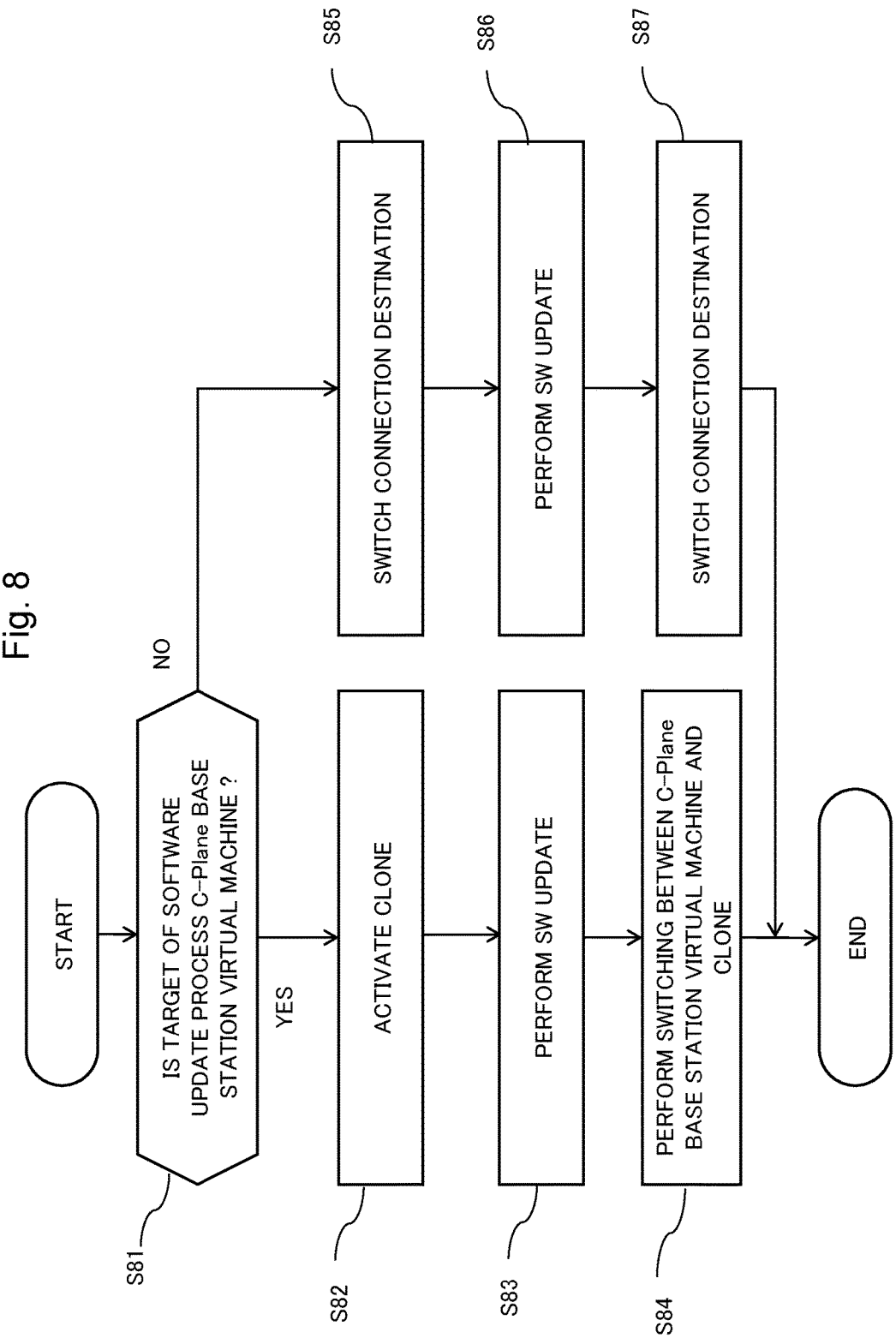
FIG. 8 is a flowchart illustrating operation of a management system according to a second example embodiment.

Next, operation of the management system according to the second example embodiment will be described by using the drawing. FIG. 8 is a flowchart illustrating the operation of the management system according to the second example embodiment. As illustrated in FIG. 8, the update control unit 220 of the management device 200 determines whether or not the target of the software update is the C-Plane base station virtual machine (step S81).

When the determination result obtained in step S81 indicates that the target of the software update is the C-Plane base station virtual machine (YES in step S81), the update control unit 220 instructs the virtual machine control unit 31 of the virtual machine control device 300 to activate the clone 420 of the C-Plane base station virtual machine 410.

The virtual machine control unit 310 activates the clone 420 of the C-Plane base station virtual machine 410 in the first virtual machine host 400 (step S82).

After activating the clone 420, the update control unit 220 transmits the update program to the clone 420 and instructs the clone 420 to perform the software update. The clone 420 verifies and validates the upload program, and performs the software update (step S83). The clone 420 informs the update control unit 220 of the completion of the software upload.

The update control unit 220 instructs the base station control unit 240 to switch the virtual machines. The base station control unit 240 instructs the virtual base station switching control unit 320 of the virtual machine control device 300 to perform the switching between the C-Plane base station virtual machine 410 and the clone 420. The virtual base station switching control unit 320 performs the switching between the C-Plane base station virtual machine 410 and the clone 420 (step S84).

Specifically, the virtual base station switching control unit 320 assigns the network assigned to the operating C-Plane base station virtual machine 410 to the clone 420. The clone 420 takes over the existing call in the C-Plane base station virtual machine 410.

On the other hand, when the determination result obtained in step S81 indicates that the base station virtual machine that is the target of the software update is not the C-Plane base station virtual machine (NO in step S81), the update control unit 220 of the management device 200 selects the U-Plane base station virtual machine that becomes the switching destination of the function unit of the U-Plane base station virtual machine 51 that is the target of the software update.

The U-Plane base station virtual machine that becomes the switching destination is selected on the basis of PM (Performance Management) data (also referred to as performance data) of a plurality of the U-Plane base station virtual machines installed in the second virtual machine host 500. For example, the U-Plane base station virtual machine 520 which has the minimum load is selected excluding the U-Plane base station virtual machine 510 in the second virtual machine host on the basis of the PM data.

The virtual base station switching control unit 320 of the virtual machine control device 300 instructs the first virtual machine host 400 and the second virtual machine host 500 to switch the connection destination so that the C-Plane base station virtual machine 410, which has been operating in conjunction with the U-Plane base station virtual machine 510 and the base station hardware 700, now operates in conjunction with the U-Plane base station virtual machine 520 that becomes the switching destination. The first virtual machine host 400 and the second virtual machine host 500 switch the connection destination of the C-Plane base station virtual machine 410 and the base station hardware 700 to the U-Plane base station virtual machine 520 (step S85).

Specifically, to switch the base station hardware 700, the virtual base station switching control unit 320 instructs the network switch (not illustrated) between the MFH (Mobile Front-Haul) and the first virtual machine host 400 and the network switch (not illustrated) between the MFH and the second virtual machine host 500 or the network switch (not illustrated) in the first virtual machine host 400 and the network switch (not illustrated) in the second virtual machine host 500 to perform the switching.

Further, to switch the connection with the C-Plane base station virtual machine 410, the virtual base station switching control unit 320 instructs the network switch (not illustrated) in the first virtual machine host 400 and the network switch (not illustrated) in the second virtual machine host 500 or the network switch (not illustrated) existing between the first virtual machine host 400 and the second virtual machine host 500 to perform the switching.

The update control unit 220 of the management device 200 transmits the update program to the U-Plane base station virtual machine 510 and instructs the U-Plane base station virtual machine 510 to perform the software update. The U-Plane base station virtual machine 510 that becomes the switching destination performs the software update (in FIG. 8, described as "perform SW update", SW is software) (step S86).

The virtual base station switching control unit 320 instructs the first virtual machine host 400 and the second virtual machine host 500 to switch the connection destination from the U-Plane base station virtual machine 520 that becomes the switching destination to the U-Plane base station virtual machine 510 to which the software update is performed. Specifically, the virtual base station switching control units 320 instructs the network switch between the MFH and the first virtual machine host 400 and the network switch between the MFH and the second virtual machine host 500 or the network switch in the first virtual machine host 400 and the network switch in the second virtual machine host 500 to perform the switching.

The first virtual machine host 400 and the second virtual machine host 500 switch the connection destination of the C-Plane base station virtual machine 410 and the base station hardware 700 to the U-Plane base station virtual machine 510 (step S87).

Next, operation of the virtual machine control device according to the second example embodiment will be described by using the drawing.

Figure 9:
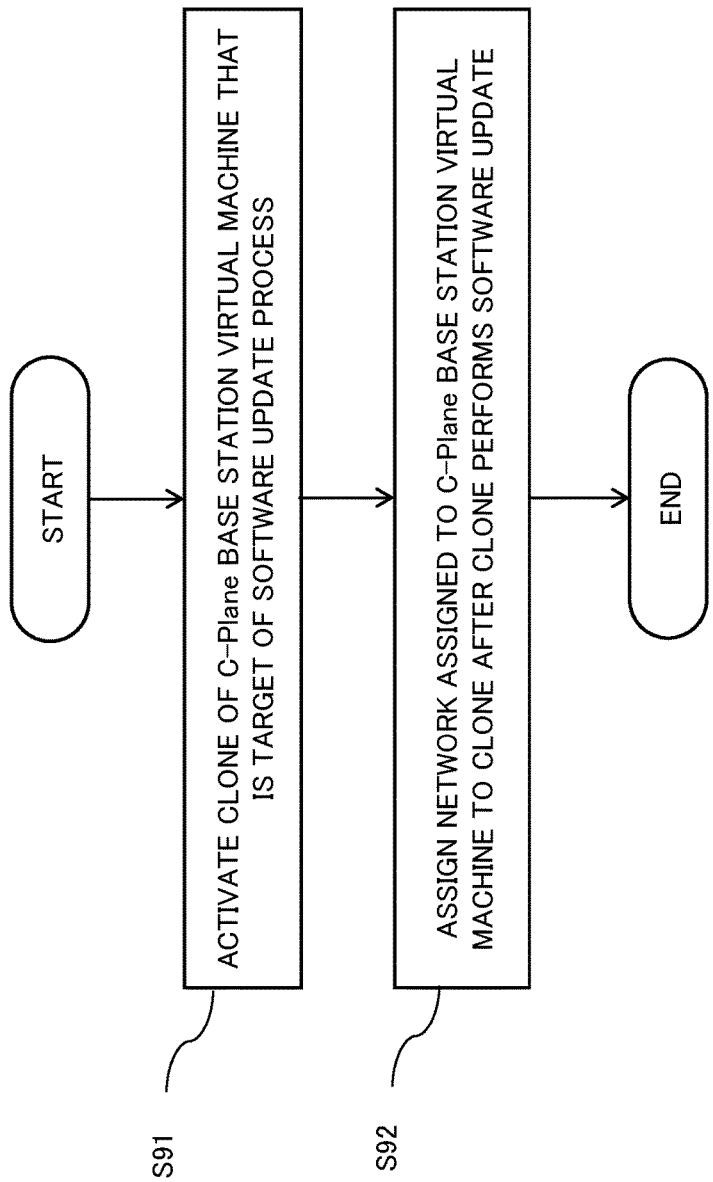
FIG. 9 is a flowchart illustrating a first operation of a virtual machine control device according to a second example embodiment.

FIG. 9 is a flowchart illustrating a first operation of the virtual machine control device according to the second example embodiment. Specifically, FIG. 9 is a flowchart illustrating the operation of the virtual machine control device 300 when the software update is performed to the C-Plane base station virtual machine 410.

As illustrated in FIG. 9, the virtual machine control unit 310 of the virtual machine control device 300 activates the clone 420 of the C-Plane base station virtual machine 410 that is the target of the software update (step S91).

After the clone 420 performs the software update, the virtual base station switching control unit 320 of the virtual machine control device 300 assigns the network assigned to the C-Plane base station virtual machine 410 to the clone 420 (step S92).

Figure 10:
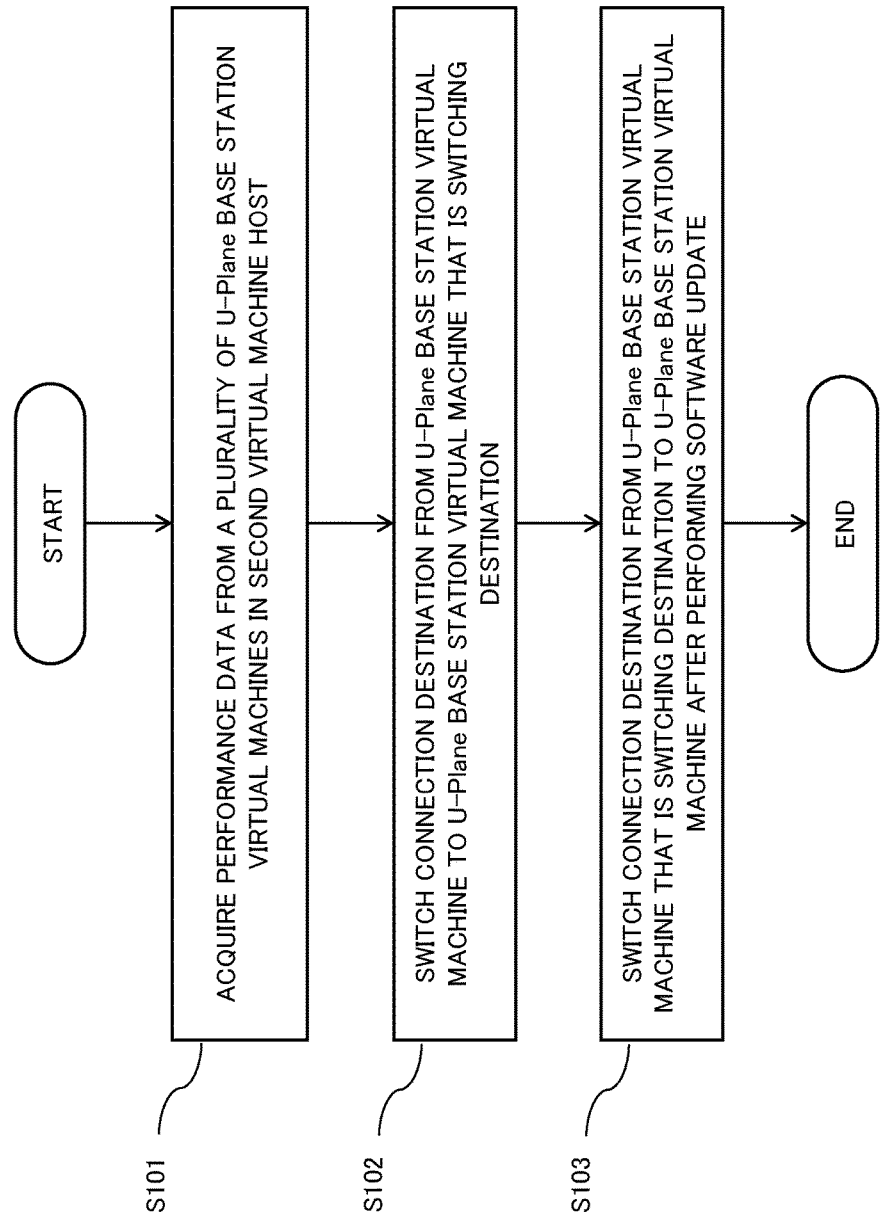
FIG. 10 is a flowchart illustrating a second operation of a virtual machine control device according to a second example embodiment.

FIG. 10 is a flowchart illustrating a second operation of the virtual machine control device according to the second example embodiment. Specifically, FIG. 10 is a flowchart illustrating the operation of the virtual machine control device 300 when the software update is performed to the U-Plane base station virtual machine 510.

As illustrated in FIG. 10, the virtual machine control unit 310 of the virtual machine control device 300 acquires the performance data from a plurality of the U-Plane base station virtual machines in the second virtual machine host 500 in which the U-Plane base station virtual machine 520 is installed in order to select the U-Plane base station virtual machine that becomes the switching destination of the U-Plane base station virtual machine 510 that is the target of the software update (step S101).

The virtual base station switching control unit 320 of the virtual machine control device 300 switches the connection destination of the C-Plane base station virtual machine 410 operating in conjunction with the U-Plane base station virtual machine 510 and the base station hardware 700 from the U-Plane base station virtual machine 510 to the U-Plane base station virtual machine 520 that becomes the switching destination (step S102).

After the U-Plane base station virtual machine 510 performs the software update, the virtual base station switching control unit 320 switches the connection destination of the C-Plane base station virtual machine 410 and the base station hardware 700 from the U-Plane base station virtual machine 520 that becomes the switching destination to the U-Plane base station virtual machine 510 (step S103).

Figure 11:
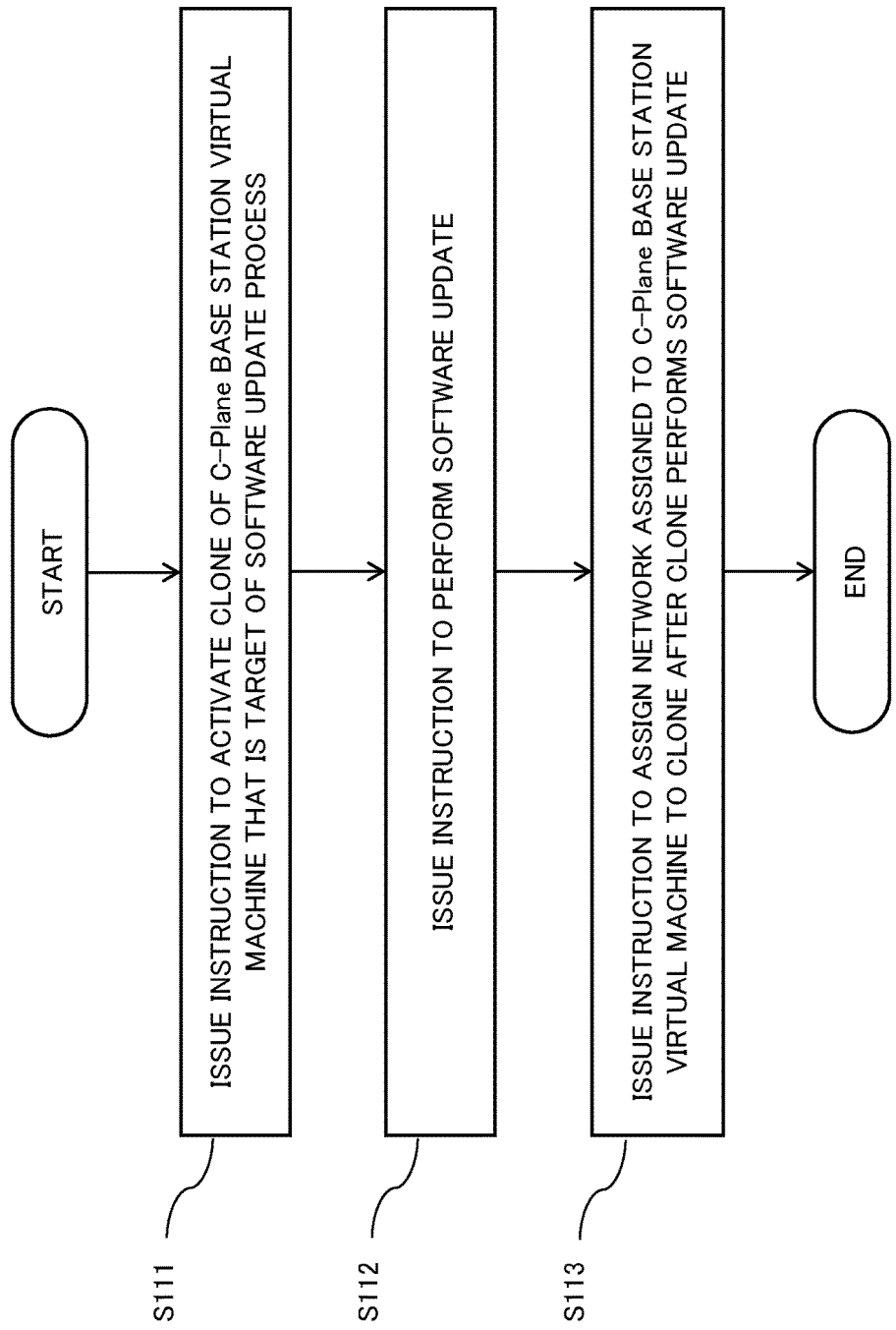
FIG. 11 is a flowchart illustrating a first operation of a management device according to a second example embodiment.

Next, operation of the management device according to the second example embodiment will be described by using the drawing. FIG. 11 is a flowchart illustrating the first operation of the management device according to the second example embodiment. Specifically, FIG. 11 is a flowchart illustrating the operation of the management device 200 when the software update is performed to the C-Plane base station virtual machine 410.

The update control unit 220 of the management device 200 instructs the virtual machine control device 300 to activate the clone 420 of the C-Plane base station virtual machine 410 that is the target of the software update (step S111).

The update control unit 220 instructs the activated clone 420 to perform the software update (step S112).

After the clone 420 performs the software update, the base station control unit 240 instructs the virtual machine control device 300 to assign the network assigned to the C-Plane base station virtual machine 410 to the clone 420 to which the software update is performed (step S113).

Figure 12:
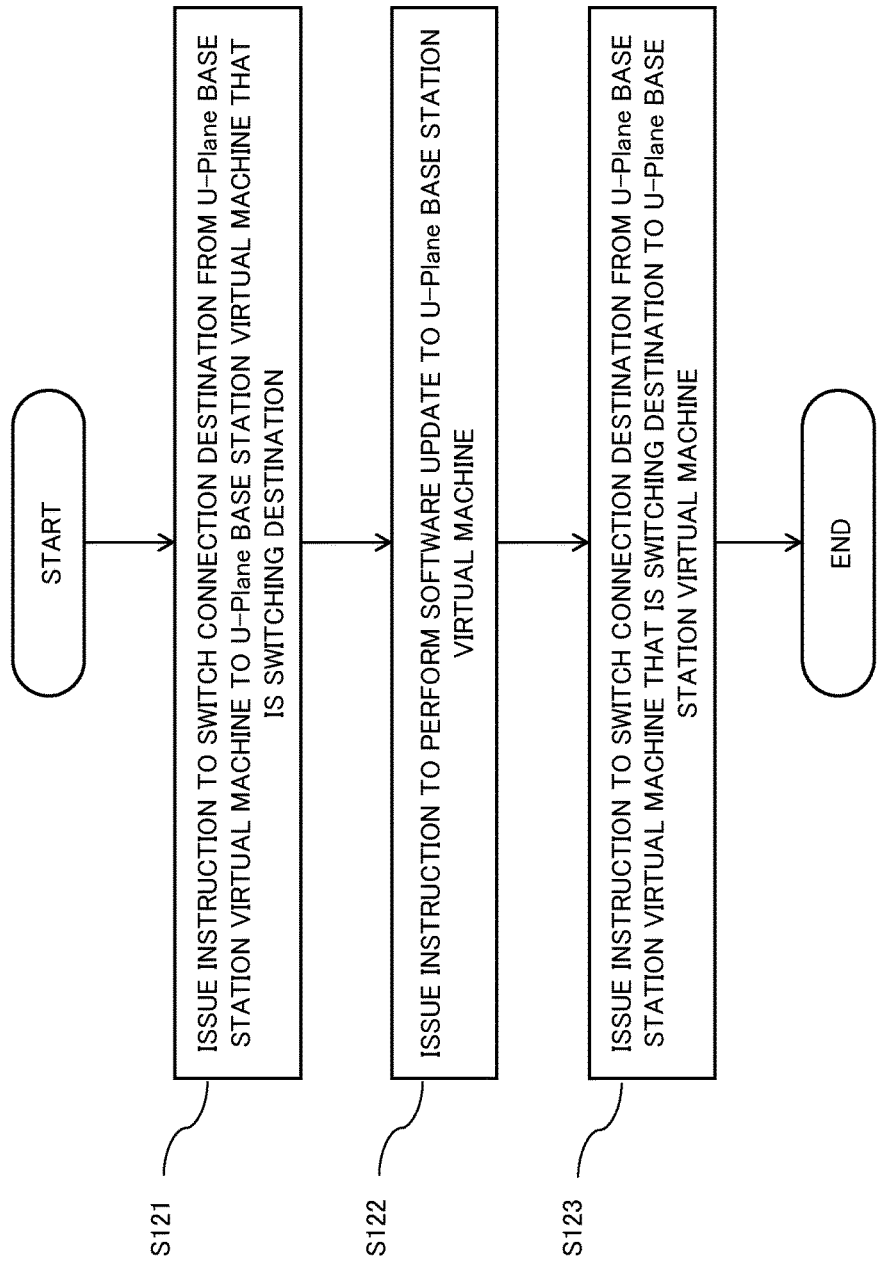
FIG. 12 is a flowchart illustrating a second operation of a management device according to a second example embodiment.

FIG. 12 is a flowchart illustrating the second operation of the management device according to the second example embodiment. Specifically, FIG. 12 is a flowchart illustrating the operation of the management device 200 when the software update is performed to the U-Plane base station virtual machine 510.

The base station control unit 240 of the management device 200 issues an instruction to switch the connection destination of the C-Plane base station virtual machine 410 operating in conjunction with the U-Plane base station virtual machine 510 that is the target of the software update and the base station hardware 700 from the U-Plane base station virtual machine 510 to the U-Plane base station virtual machine 520 that becomes the switching destination (step S121).

The update control unit 220 instructs the U-Plane base station virtual machine 510 to perform the software update (step S122).

After performing the software update, the base station control unit 240 issues an instruction to switch from the U-Plane base station virtual machine 520 that becomes the switching destination to the U-Plane base station virtual machine 510 (step S123).

Effect of Second Example Embodiment

According to the second example embodiment, when the software update is performed to the base station virtual machine, the service outage time of the virtualized base station can be reduced.

A first reason is that after the clone of the C-Plane base station virtual machine that is the target of the software update is activated and the software update is performed to the activated clone, the network connection is changed so that the network coupled to the C-Plane base station virtual machine that is the target of the software update is coupled to the clone to which the software update is performed.

A second reason is that the connection destination of the C-Plane base station virtual machine operating in conjunction with the U-Plane base station virtual machine that is the target of the software update and the base station hardware is switched to another U-Plane base station virtual machine, the software update is performed to the U-Plane base station virtual machine that is the target of the software update while being switched, and after the completion of the software update, the switching is performed so that the connection is restored to the original state in which the network is coupled to the original U-Plane base station virtual machine.

Hardware Configuration

Figure 13:
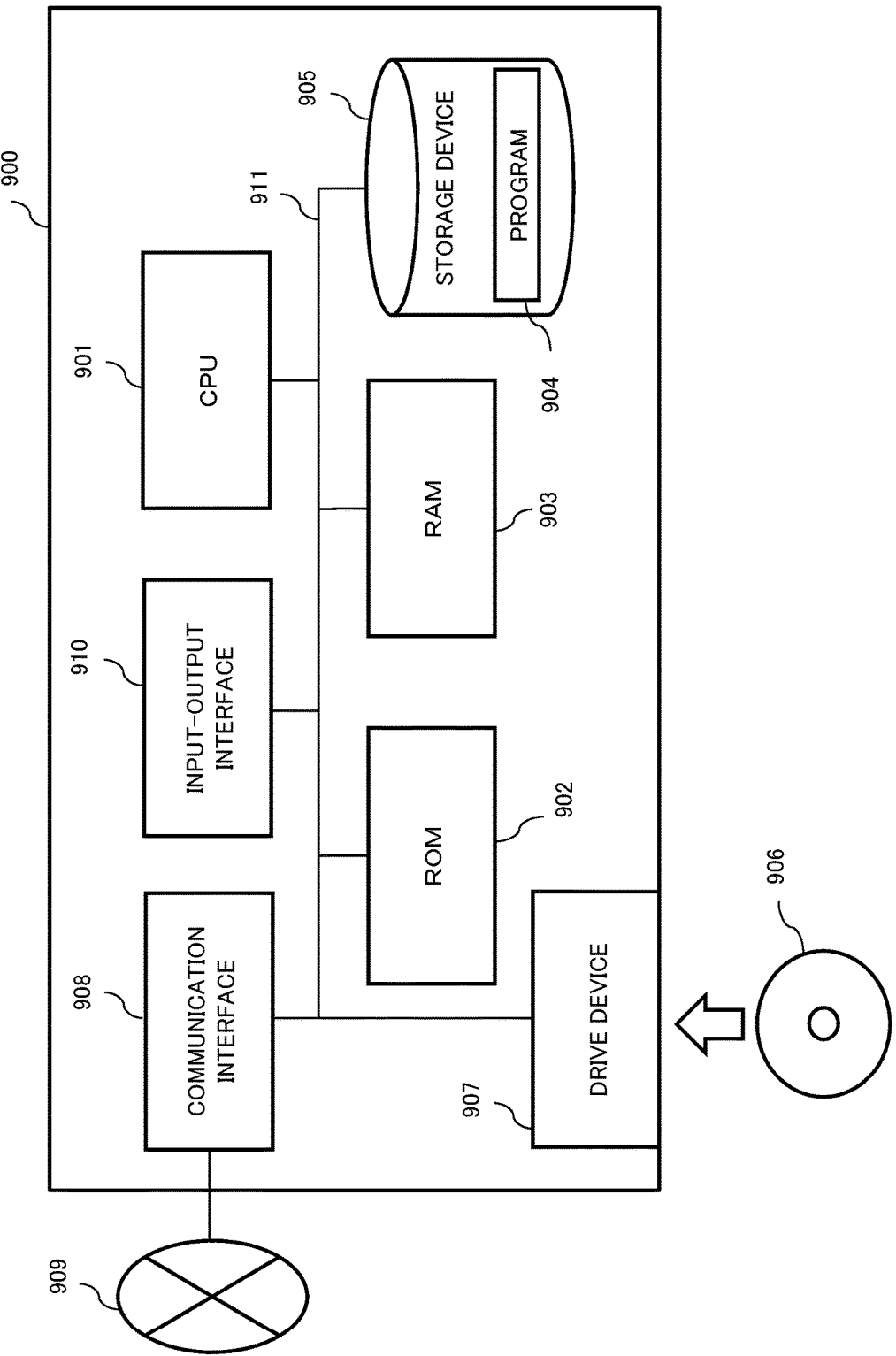
FIG. 13 is a block diagram illustrating a hardware configuration in which the management device or the like according to first and second example embodiments is realized by a computer.

FIG. 13 is a figure illustrating a hardware configuration in which the management device, the EMS server, the virtual machine control device, and the virtual machine host according to the first and second example embodiments are realized by a computer.

In the first and second example embodiments, each component such as the management device or the like is a functional unit block. For example, a part of or an entire of each component such as the management device or the like is realized by an arbitrary combination of a computer 900 and a program as illustrated in FIG. 13. For example, the computer 900 may include the following devices:

a CPU 901,
a ROM (Read Only Memory) 902,
a RAM (Random Access Memory) 903,
a program 904 loaded in the RAM 903,
a storage device 905 storing the program 904,
a drive device 907 which reads/writes data from/in the storage medium 906,
a communication interface 908 connecting to a communication network 909,
an input-output interface 910 for inputting/outputting data, and
a bus 911 connecting between the components.

Each component of the management device or the like is realized when the CPU 901 acquires the program 904 for realizing these functions and executes it. For example, the program 904 for realizing the function of each component is stored in the storage device 905 or the RAM 903 in advance and the CPU 901 reads it when needed. Further, the program 904 may be supplied to the CPU 901 via the communication network 909. Alternatively, it is stored in the storage medium 906 in advance and the drive device 907 may read the program and supply it to the CPU 901.

As a method for realizing the management device or the like, various modified methods can be used. For example, the management device or the like may be realized by an arbitrary combination of the computer 900 and program that are individually provided for each component. Further, a plurality of components included in the management device may be realized by an arbitrary combination of one computer 900 and one program.

Further, a part of or an entire of each component of the management device or the like is realized by another general-purpose or dedicated circuit, a processor or the like, or a combination of these devices. These devices may be composed of a single chip or a plurality of chips coupled to each other via a bus. Further, a programmable logic device such as an FPGA (Field-Programmable Gate Array) may be used instead of the computer 900.

Further, a part of or an entire of each component of the management device or the like may be realized by a combination of the above-mentioned circuit or the like and the program.

Further, when a part of or an entire of each component of the management device or the like is realized by a plurality of computers, the circuit, and the like, a plurality of computers, the circuit, and the like may be installed at one place or installed in a distributed manner. For example, the computer, the circuit, and the like may be realized as a client and server system, a cloud computing system, or the like in which these devices are coupled to each other via the communication network.

The disclosed subject matter of the present application has been described above with reference to the example embodiment. However, the disclosed subject matter of the present application is not limited to the above-mentioned example embodiment. Various changes in the configuration or details of the disclosed subject matter of the present application that can be understood by those skilled in the art can be made without departing from the scope of the disclosed subject matter of the present application.

Part or the whole of the above-described example embodiments can be described as, but are not limited to, the following supplementary notes.

Supplementary Note 1

A virtual machine control device that controls a C-Plane base station virtual machine for providing a base station function of a virtual base station, the virtual machine control device includes:

a virtual machine controller configured to activate a clone of the C-Plane base station virtual machine that is a target of software update; and a virtual base station switching controller configured to assign a network assigned to the C-Plane base station virtual machine to the clone after performing the software update to the clone.

Supplementary Note 2

A virtual machine control device that controls a U-Plane base station virtual machine for providing a base station function of a virtual base station, the virtual machine control device includes:

a virtual machine controller configured to acquire performance data from a plurality of U-Plane base station virtual machines in a virtual machine host, in which the U-Plane base station virtual machine is installed, for selecting a switching destination U-Plane base station virtual machine that becomes a switching destination of the U-Plane base station virtual machine that is a target of software update; and a virtual base station switching controller configured to switch a connection destination of a C-Plane base station virtual machine operating in conjunction with the U-Plane base station virtual machine and base station hardware to the U-Plane base station virtual machine or the switching destination U-Plane base station virtual machine, wherein the virtual base station switching controller selects, as the connection destination of the C-Plane base station virtual machine and the base station hardware, the U-Plane base station virtual machine before performing the software update and the switching destination U-Plane base station virtual machine after performing the software update.

Supplementary Note 3

A management device coupled to a virtual machine control device that controls a C-Plane base station virtual machine for providing a base station function in a virtual base station, the management device includes:
an update controller configured to instruct the virtual machine control device to activate a clone of the C-Plane base station virtual machine that is a target of software update and instruct an activated clone to perform software update; and
a base station controller configured to instruct the virtual machine control device to assign a network assigned to the C-Plane base station virtual machine that is the target of software update to the clone to which the software update is performed.

Supplementary Note 4

A management device coupled to a virtual machine control device that controls a U-Plane base station virtual machine for providing a base station function as a virtual base station, the management device includes:
an update controller configured to instruct the U-Plane base station virtual machine to perform software update after a connection destination of a C-Plane base station virtual machine operating in conjunction with the U-Plane base station virtual machine that is a target of software update and base station hardware is switched to a switching destination U-Plane base station virtual machine that becomes a switching destination of the U-Plane base station virtual machine; and
a base station controller configured to instruct a virtual machine control device to switch a connection destination of the C-Plane base station virtual machine and the base station hardware from the U-Plane base station virtual machine to the switching destination U-Plane base station virtual machine before performing the software update and to switch the connection destination of the C-Plane base station virtual machine and the base station hardware from the switching destination U-Plane base station virtual machine to the U-Plane base station virtual machine after performing the software update.

Supplementary Note 5

The management device described in Supplementary note 4, wherein
the update controller acquires performance data of a plurality of the U-Plane base station virtual machines in a virtual machine host in which the U-Plane base station virtual machine is installed, and selects the base station virtual machine that becomes the switching destination based on the performance data of a plurality of the U-Plane base station virtual machines other than the U-Plane base station virtual machine that is the target of software update.

Supplementary Note 6

A method for controlling a virtual machine control device that controls a C-Plane base station virtual machine for providing a base station function of a virtual base station, the method includes:

activating a clone of the C-Plane base station virtual machine that is a target of software update; and
assigning a network assigned to the C-Plane base station virtual machine to the clone after performing the software update to the clone.

Supplementary Note 7

A method for controlling a virtual machine control device that controls a U-Plane base station virtual machine for providing a base station function of a virtual base station, the method includes:
acquiring performance data from a plurality of U-Plane base station virtual machines in a virtual machine host, in which the U-Plane base station virtual machine is installed, for selecting a switching destination U-Plane base station virtual machine that becomes a switching destination of the U-Plane base station virtual machine that is a target of software update;
switching a connection destination of a C-Plane base station virtual machine operating in conjunction with the U-Plane base station virtual machine and base station hardware from the U-Plane base station virtual machine to the U-Plane base station virtual machine that becomes the switching destination; and
switching the connection destination of the C-Plane base station virtual machine and the base station hardware from the U-Plane base station virtual machine that becomes the switching destination to the U-Plane base station virtual machine after performing the software update.

Supplementary Note 8

A method for controlling a management device coupled to a virtual machine control device that controls a C-Plane base station virtual machine for providing a base station function in a virtual base station, the method includes:
instructing the virtual machine control device to activate a clone of the C-Plane base station virtual machine that is a target of software update;
instructing an activated clone to perform the software update; and
instructing the virtual machine control device to assign a network assigned to the C-Plane base station virtual machine that is the target of software update to the clone to which the software update is performed.

Supplementary Note 9

A method for controlling a management device coupled to a virtual machine control device that controls a U-Plane base station virtual machine for providing a base station function as a virtual base station, the method includes:
issuing an instruction to switch a connection destination of a C-Plane base station virtual machine operating in conjunction with the U-Plane base station virtual machine that is a target of software update and base station hardware from the U-Plane base station virtual machine to the U-Plane base station virtual machine that becomes a switching destination;
instructing the U-Plane base station virtual machine to perform the software update; and
issuing an instruction to switch the connection destination of the C-Plane base station virtual machine and the base station hardware from the U-Plane base station virtual machine that becomes the switching destination to the U-Plane base station virtual machine after performing the software update.

REFERENCE SIGNS LIST

10 EMS client
11 GUI processing unit
20 EMS server
21 client control unit
22 update control unit
23 base station SW management unit
24 base station control unit
30 virtual machine control device
31 virtual machine control unit
32 virtual base station switching control unit
40 first virtual machine host
41 C-Plane base station virtual machine
42 clone
50 second virtual machine host
51 U-Plane base station virtual machine
52 U-Plane base station virtual machine
60 storage device
70 base station hardware
200 management device
220 update control unit
240 base station control unit
300 virtual machine control device
310 virtual machine control unit
320 virtual base station switching control unit
400 first virtual machine host
410 C-Plane base station virtual machine
420 clone
500 second virtual machine host
510 U-Plane base station virtual machine
520 U-Plane base station virtual machine
700 base station hardware
901 CPU
902 ROM
903 RAM
904 program
905 storage device
906 storage medium
907 drive device
908 communication interface
909 communication network
910 input-output interface
911 system bus

What is claimed is:

1. A virtual machine control device that controls a C-Plane base station virtual machine for providing a base station function of a virtual base station, the virtual machine control device comprising:
a virtual machine controller configured to activate a clone of the C-Plane base station virtual machine that is a target of software update; and
a virtual base station switching controller configured to assign a network assigned to the C-Plane base station virtual machine to the clone after performing the software update to the clone.

2. The virtual machine control device that controls a U-Plane base station virtual machine for providing the base station function of the virtual base station described in claim 1,
wherein the virtual machine controller is configured to acquire performance data from the at least one U-Plane base station virtual machine in a virtual machine host, in which the U-Plane base station virtual machine is installed, for selecting a switching destination U-Plane base station virtual machine that becomes a switching destination of the U-Plane base station virtual machine that is a target of software update, and
wherein the virtual base station switching controller is configured to switch a connection destination of the C-Plane base station virtual machine operating in conjunction with the U-Plane base station virtual machine and base station hardware to the U-Plane base station virtual machine or the switching destination U-Plane base station virtual machine,
wherein the virtual base station switching controller selects, as the connection destination of the C-Plane base station virtual machine and the base station hardware, the U-Plane base station virtual machine before performing the software update and the switching destination U-Plane base station virtual machine after performing the software update.

3. A management device coupled to a virtual machine control device that controls a C-Plane base station virtual machine for providing a base station function in a virtual base station, the management device comprising:
an update controller configured to instruct the virtual machine control device to activate a clone of the C-Plane base station virtual machine that is a target of software update and instruct an activated clone to perform software update; and
a base station controller configured to instruct the virtual machine control device to assign a network assigned to the C-Plane base station virtual machine that is the target of software update to the clone to which the software update is performed.

4. The management device coupled to the virtual machine control device that controls a U-Plane base station virtual machine for providing the base station function as the virtual base station described in claim 3, the management device,
wherein the update controller is configured to instruct the U-Plane base station virtual machine to perform software update after a connection destination of the C-Plane base station virtual machine operating in conjunction with the U-Plane base station virtual machine that is a target of software update and base station hardware is switched to a switching destination U-Plane base station virtual machine that becomes a switching destination of the U-Plane base station virtual machine; and
wherein the base station controller is configured to instruct the virtual machine control device to switch a connection destination of the C-Plane base station virtual machine and the base station hardware from the U-Plane base station virtual machine to the switching destination U-Plane base station virtual machine before performing the software update and to switch the connection destination of the C-Plane base station virtual machine and the base station hardware from the switching destination U-Plane base station virtual machine to the U-Plane base station virtual machine after performing the software update.

5. The management device described in claim 4, wherein the update controller acquires performance data of a plurality of the U-Plane base station virtual machines in a virtual machine host in which the U-Plane base station virtual machine is installed, and selects the base station virtual machine that becomes the switching destination based on the performance data of a plurality of the U-Plane base station virtual machines other than the U-Plane base station virtual machine that is the target of software update.

6. A method for controlling a virtual machine control device that controls a C-Plane base station virtual machine for providing a base station function of a virtual base station, the method comprising:
- activating a clone of the C-Plane base station virtual machine that is a target of software update; and
- assigning a network assigned to the C-Plane base station virtual machine to the clone after performing the software update to the clone.

7. The method for controlling the virtual machine control device that controls a U-Plane base station virtual machine for providing the base station function of the virtual base station described in claim 6, the method further comprising:
- acquiring performance data from the at least one U-Plane base station virtual machine in a virtual machine host, in which the U-Plane base station virtual machine is installed, for selecting a switching destination U-Plane base station virtual machine that becomes a switching destination of the U-Plane base station virtual machine that is a target of software update;
- switching a connection destination of a C-Plane base station virtual machine operating in conjunction with the U-Plane base station virtual machine and base station hardware from the U-Plane base station virtual machine to the U-Plane base station virtual machine that becomes the switching destination; and
- switching the connection destination of the C-Plane base station virtual machine and the base station hardware from the U-Plane base station virtual machine that becomes the switching destination to the U-Plane base station virtual machine after performing the software update.

\* \* \* \* \*

UNITED STATES PATENT AND TRADEMARK OFFICE
CERTIFICATE OF CORRECTION

PATENT NO. : 10,203,979 B2
APPLICATION NO. : 15/672831
DATED : February 12, 2019
INVENTOR(S) : Atsushi Shimizu Page 1 of 1

It is certified that error appears in the above-identified patent and that said Letters Patent is hereby corrected as shown below:

In the Specification

Column 10, Example Embodiment, Line 1; Delete "51" and insert --S1-- therefor

Signed and Sealed this
Twenty-third Day of July, 2019

Andrei Iancu
*Director of the United States Patent and Trademark Office*